(12) United States Patent
Machida et al.

(10) Patent No.: US 12,168,299 B2
(45) Date of Patent: Dec. 17, 2024

(54) INFORMATION PROCESSING DEVICE, CONTROL METHOD, AND STORAGE MEDIUM

(71) Applicant: NEC Corporation, Tokyo (JP)

(72) Inventors: Manao Machida, Tokyo (JP); Masumi Ichien, Tokyo (JP)

(73) Assignee: NEC CORPORATION, Tokyo (JP)

( * ) Notice: Subject to any disclaimer, the term of this patent is extended or adjusted under 35 U.S.C. 154(b) by 400 days.

(21) Appl. No.: 17/624,865

(22) PCT Filed: Sep. 9, 2019

(86) PCT No.: PCT/JP2019/035405
§ 371 (c)(1),
(2) Date: Jan. 5, 2022

(87) PCT Pub. No.: WO2021/009933
PCT Pub. Date: Jan. 21, 2021

(65) Prior Publication Data
US 2022/0258343 A1    Aug. 18, 2022

(30) Foreign Application Priority Data

Jul. 18, 2019 (WO) .................. PCT/JP2019/028275

(51) Int. Cl.
*B25J 9/16* (2006.01)
(52) U.S. Cl.
CPC ... *B25J 9/1661* (2013.01); *G05B 2219/39001* (2013.01)
(58) Field of Classification Search
CPC .............. B25J 9/1661; G05B 2219/39001
See application file for complete search history.

(56) References Cited

U.S. PATENT DOCUMENTS

2020/0050206 A1* 2/2020 Deyle ................. G05D 1/0261

FOREIGN PATENT DOCUMENTS

| JP | S63-238607 A | 10/1988 | |
| JP | 2009-288930 A | 12/2009 | |
| JP | 2010142940 A * | 7/2010 | ............ B25J 9/1661 |

OTHER PUBLICATIONS

WIPO English translation of JP-2010142940-A. (Year: 2010).*
International Search Report for PCT Application No. PCT/JP2019/035405, mailed on Oct. 15, 2019.
Naomi Ehrich Leonard et al., "Virtual leaders, artificial potentials and coordinated control of groups", 40th IEEE Conf. Decision and Control, 2001. p. 2968-2973.

* cited by examiner

*Primary Examiner* — Jason Holloway
*Assistant Examiner* — Christopher A Buksa
(74) *Attorney, Agent, or Firm* — Sughrue Mion, PLLC

(57) ABSTRACT

The information processing device 1B includes an acquisition unit 51A, a potential function synthesizing unit 53A, and an objective function outputting unit 54A. The acquisition unit 51A acquires a task logical expression in which an objective task to be performed by a robot is expressed by a combination of a plurality of atomic tasks. The potential function synthesizing unit 53A synthesizes atomic potential functions, each of which is a potential function corresponding to each of the atomic tasks, based on the task logical expression. The objective function output unit 54A outputs an atomic potential function synthesized based on the task logical expression as an objective function for controlling the robot.

12 Claims, 9 Drawing Sheets

41

INFORMATION PROCESSING DEVICE, CONTROL METHOD, AND STORAGE MEDIUM

This application is a National Stage Entry of PCT/JP2019/035405 filed on Sep. 9, 2019, which claims priority from PCT Patent Application PCT/JP2019/028275 filed on Jul. 18, 2019, the contents of all of which are incorporated herein by reference, in their entirety.

TECHNICAL FIELD

The present invention relates to a technical field of an information processing device, a control method, and a storage medium for performing processing related to a task to be performed by a robot.

BACKGROUND ART

One of the path derivation methods for a robot is the technique called the potential method (artificial potential field method). In the artificial potential field method, when the robot is controlled to work, the objective function according to the work is designed, and the robot moves in the direction in which the objective function decreases. Patent Literature 1 discloses a robot which generates a route to the target position by generating a virtual attractive potential field for the target position and a virtual repulsive potential field for obstacles and making them overlap. Further, Non-Patent Literature 1 discloses a robot model using the artificial potential field method in which the acceleration is used for the control input.

PRIOR ART DOCUMENTS

Patent Literature

Patent Literature 1: JP 2009-288930A

Non-Patent Literature

Non-Patent Literature 1: N. E. Leonard and E. Fiorelli. Virtual leaders, artificial potentials and coordinated control of groups. Proc. of the 40th IEEE Conf. on Decision and Control, pp. 2968-2973, 2001.

SUMMARY OF THE INVENTION

Problem to be Solved by the Invention

When a robot executes a task with complicated work based on the potential method, it becomes difficult to design an objective function to be set. In such a case, there is an issue that only experts with advanced knowledge can design the objective function.

In view of the above-described issue, it is therefore an example object of the present disclosure to provide an information processing device, a control method and a storage medium capable of suitably outputting an objective function when using the potential method.

Means for Solving the Problem

In one mode of the information processing device, there is provided an information processing device including: an acquisition unit configured to acquire a logical expression in which an objective task to be performed by a robot is expressed by a combination of a plurality of tasks; a potential function synthesizing unit configured to synthesize atomic potential functions, each of which is a potential function corresponding to each of the tasks, based on the logical expression; and an objective function output unit configured to output a potential function synthesized based on the logical expression as an objective function for controlling the robot.

In one mode of the control method, there is provided a control method executed by an information processing device, the control method including: acquiring a logical expression in which an objective task to be performed by a robot is expressed by a combination of a plurality of tasks; synthesizing atomic potential functions, each of which is a potential function corresponding to each of the tasks, based on the logical expression; and outputting a potential function synthesized based on the logical expression as an objective function for controlling the robot.

In one mode of the storage medium, there is provided a storage medium storing a program executed by a computer, the program causing the computer to function as: an acquisition unit configured to acquire a logical expression in which an objective task to be performed by a robot is expressed by a combination of a plurality of tasks; a potential function synthesizing unit configured to synthesize atomic potential functions, each of which is a potential function corresponding to each of the tasks, based on the logical expression; and an objective function output unit configured to output a potential function synthesized based on the logical expression as an objective function for controlling the robot.

Effect of the Invention

An example advantage according to the present invention is to suitably determine and output an objective function when the potential method is used.

DESCRIPTION OF EXAMPLE EMBODIMENTS

Hereinafter, example embodiments of an information processing device, a control method, and a storage medium will be described with reference to the drawings.

First Example Embodiment

[System Configuration]

Figure 1:
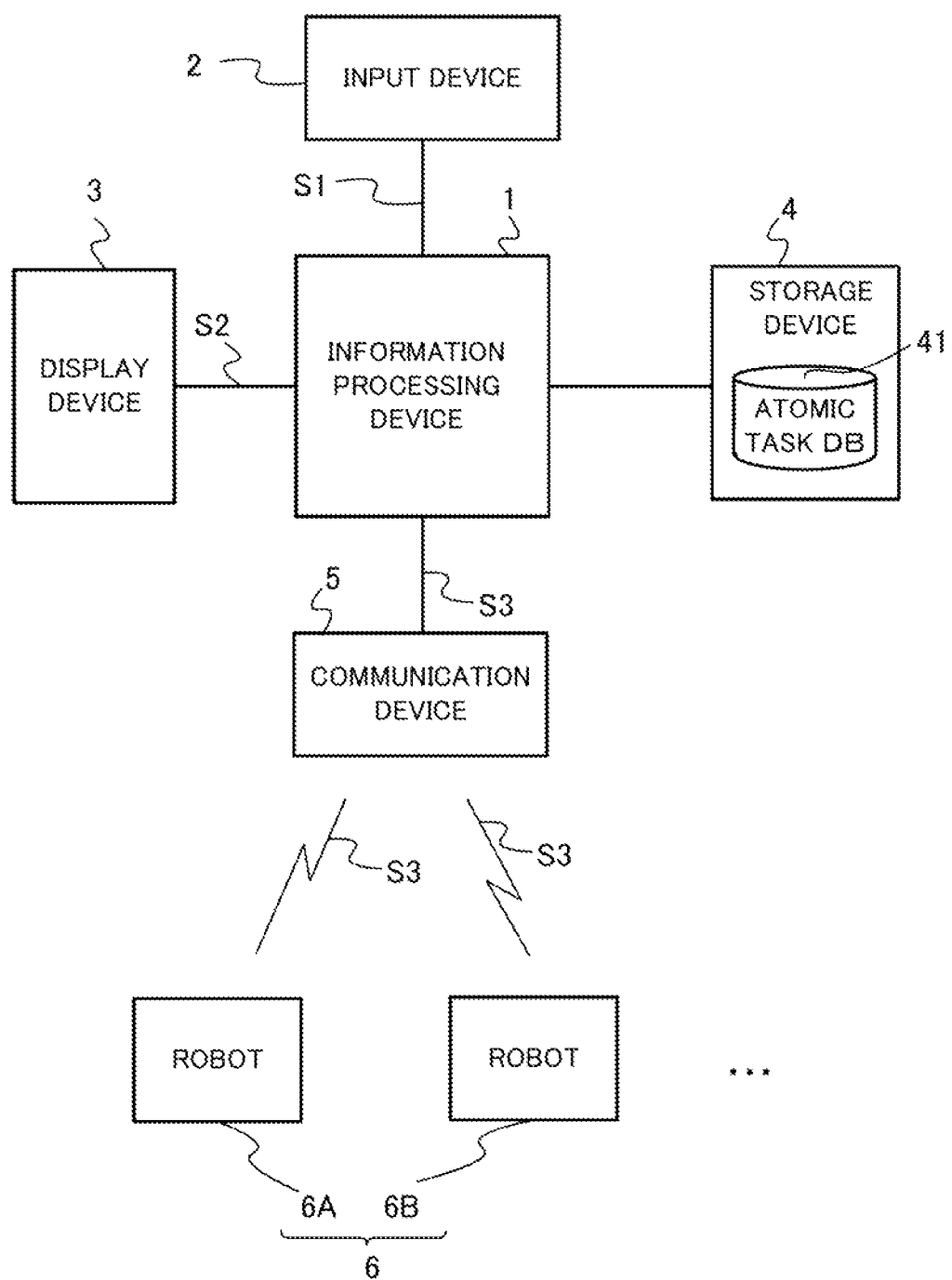
FIG. 1 illustrates the configuration of a robot control system.

FIG. 1 shows a configuration of a robot control system 100 according to the first example embodiment. The robot control system 100 mainly includes an information processing device 1, an input device 2, a display device 3, a storage device 4, a communication device 5, and a plurality of robots 6 (6A, 6B, . . . ). The storage device 4 includes an atomic task DB 41.

The information processing device 1 sets an objective function for controlling the robots 6 subjected to control according to the potential method (artificial potential field approach). In this case, the information processing device 1 suitably generates the objective function necessary for executing a task when a logical expression (also referred to as "task logical expression") which expresses a task to be performed by the robots 6 by a combination of simple tasks is given through user input. Hereafter, a task to be performed by the robots 6 is referred to as "objective task", and each simple task when the target task is expressed by a combination of simple tasks is referred to as "atomic task". The objective task is, for example, a complex task that causes multiple robots 6 to work jointly, and the atomic task is a simple task to be performed by one robot 6.

The information processing device 1 is electrically connected to the input device 2, the display device 3, the storage device 4 and the communication device 5. For example, the information processing device 1 receives the input signal "S1" generated based on the user's operation or the like from the input device 2. Here, when the input signal S1 includes information indicative of the task logical expression, the information processing device 1 refers to the atomic task DB 41 stored in the storage device 4 and converts the task logical expression indicated by the input signal S1 into an objective function. Further, when the input signal S1 includes information relating to updating of the atomic task DB 41, the information processing device 1 updates the atomic task DB 41 stored in the storage device 4 based on the input signal S1. Further, the information processing device 1 transmits to the display device 3 a display signal "S2" for displaying information relating to the task to be executed by the robots 6. Further, the information processing device 1 transmits, to the robots 6, a control signal "S3" relating to the control of the robots 6 via the communication device 5. For example, the information processing device 1 transmits, to the robots 6 through the communication device 5, the control signal S3 indicative of the objective function for defining the operation of each of the robots 6.

The input device 2 is an interface that receives the input by the user such as a touch panel, a button, a keyboard, a voice input device, and the like. The input device 2 supplies the input signal S1 generated based on the input by the user to the information processing device 1. It is noted that the input device 2 may be integrated with the information processing device 1 as one device in such a state that it is incorporated in the information processing device 1.

The display device 3 displays information based on the display signal S2 supplied from the information processing device 1, and the examples of the display device 3 include a display and a projector. As will be described later, for example, on the basis of the display signal S2, the display device 3 displays an input view (also referred to as a "task input view") in which an objective task is to be specified in the form of a task logical expression. The display device 3 may be configured to be integrated with the information processing device 1 as one device.

The storage device 4 is a memory configured to store the atomic task DB 41 and the like. The atomic task DB 41 is a database on atomic tasks that configure the objective tasks to be performed by the robots 6. The data structure of the atomic task DB 41 will be described later. The storage device 4 may be an external storage device such as a hard disk connected to or built in to the information processing device 1, or may be a storage medium such as a flash memory. The storage device 4 may be a server device that performs data communication with the information processing device 1. In this case, the storage device 4 may be configured by a plurality of server devices.

The communication device 5 is a network adapter or the like, and communicates with the information processing device 1 and the robots 6. The communication between the communication device 5 and each of the robots 6 may be a wireless communication or a wired communication. It is noted that the communication device 5 may be integrated with the information processing device 1 as one device in such a state that it is incorporated in the information processing device 1.

The robots 6 (6A, 6B, . . . ) perform operations based on the control signal S3 transmitted from the communication device 5. In the present example embodiment, when the objective function is specified by the control signal S3, each of the robots 6 autonomously moves so that the objective function is reduced. Further, for example, each of the robots 6 acquires the respective position information regarding the own and other robots 6 in order to input to the objective function specified by the control signal S3. In this case, each of the robots 6 includes, for example, one or more inner-field sensors and outer-field sensors and acquires position information and the like regarding the own and other robots 6 based on the output of these sensors. In another example, each of the robots 6 may acquire the position information by communicating with the other robots 6. In still another example, when the information processing device 1 collects the position information regarding each of the robots 6, each of the robots 6 may receive the collected position information regarding each object from the information processing device 1. In still another example, when such an objective function for the objective task that the robots 6 capture (track) one or more objects is given, the robots 6 acquires not only the position information regarding each of the robots 6 but also the position information regarding the objects.

[Hardware Configuration of Information Processing Device]

Figure 2:
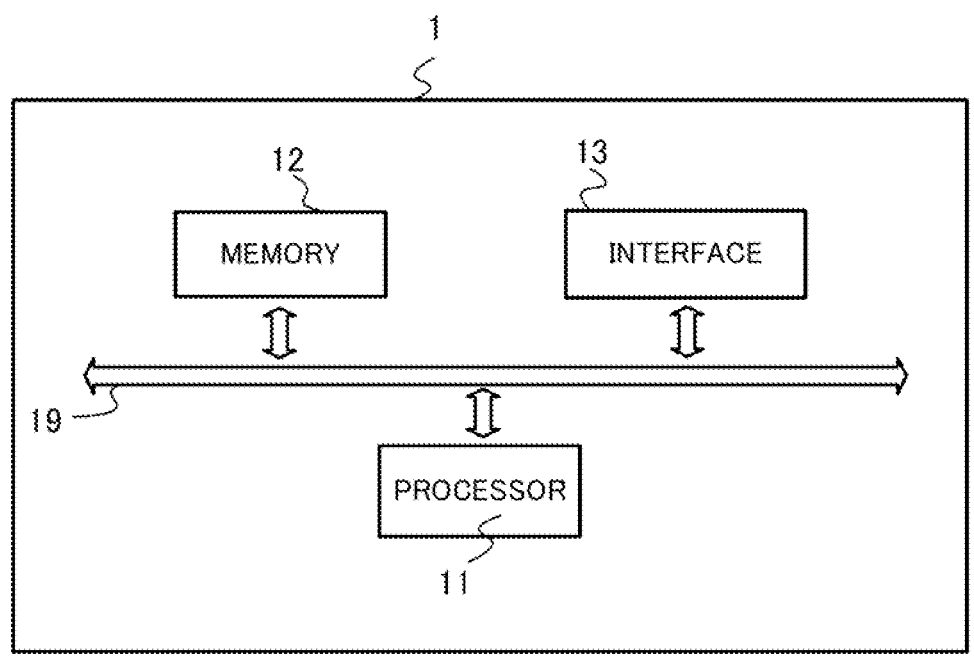
FIG. 2 illustrates the hardware configuration of an information processing device.

FIG. 2 shows the hardware configuration of the information processing device 1. The information processing device 1 includes a processor 11, a memory 12, and an interface 13 as hardware. The processor 11, the memory 12, and the interface 13 are connected to one another via a data bus 19.

The processor 11 executes a predetermined process by executing a program stored in the memory 12. The processor 11 is a processor such as a CPU (Central Processing Unit) or a GPU (Graphics Processing Unit).

The memory 12 is configured by various memories such as a RAM (Random Access Memory) and a ROM (Read Only Memory). In addition, a program for executing a predetermined process by the information processing device 1 is stored in the memory 12. The memory 12 is used as a work memory and temporarily stores information acquired from the storage device 4. The memory 12 may function as a storage device 4. Similarly, the storage device 4 may function as a memory 12 of the information processing device 1. The program executed by the information processing device 1 may be stored in a storage medium other than the memory 12.

The interface 13 is an interface for electrically connecting the information processing device 1 and other devices. For example, the interface 13 includes an interface for connecting the information processing device 1 and the input device 2, an interface for connecting the information processing device 1 and the display device 3, an interface for connecting the information processing device 1 and the storage device 4, and an interface for connecting the information processing device 1 and the communication device 5. The interface for connecting the information processing device 1 and the storage device 4 may be a communication interface for wired or wireless transmission and reception of data to and from the storage device 4 under the control of the processor 11. In this case, the interface 13 may perform data communication with the storage device 4 through the communication device 5. In another example, the information processing device 1 and the storage device 4 may be connected by a cable or the like. In this case, the interface 13 includes an interface which confirms to USB or SATA (Serial AT Attachment) or the like for exchanging data with the storage device 4. The interface 13 may be an interface for the information processing device 1 to transmit and receive signals to and from the inner sensors and the outer sensors. In this case, the external sensors may be a camera and/or a range measuring sensor for acquiring the position information regarding each of the robots 6 (including the position information regarding an object when the object is a tracking target).

The hardware configuration of the information processing device 1 is not limited to the configuration shown in FIG. 2. For example, the information processing device 1 may include at least one of an input device 2, a display device 3, a storage device 4, and a communication device 5. Further, a sound output device such as a speaker may be connected or built in to the information processing device 1. In these cases, the information processing device 1 may be a tablet type terminal or the like in which the input function and the output function are integrated with the main body.

[Atomic Task DB]

Next, the data structure of the atomic task DB 41 will be described.

Figure 3A:
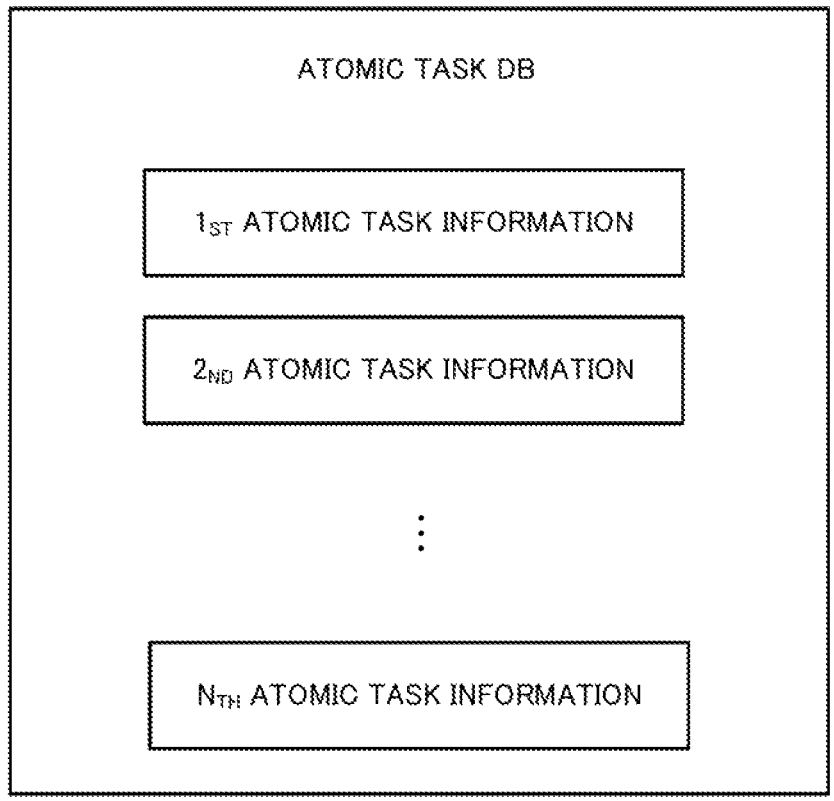
FIG. 3A is an example of the data structure of an atomic task DB

FIG. 3A shows an exemplary data structure of the atomic task DB 41. As shown in FIG. 3A, the atomic task DB 41 has N (N is an integer of 2 or more) pieces of atomic task information (the first atomic task information to the Nth atomic task information) corresponding to N atomic tasks, respectively. The atomic task information is information regarding atomic tasks, and the detail thereof will be described later. The atomic task information included in the atomic task DB 41 may be stored in the storage device 4 in advance as an initial setting, or may be generated by the information processing device 1 in response to an input signal S1 based on a user input to the input device 2 and stored in the storage device 4.

Figure 3B:
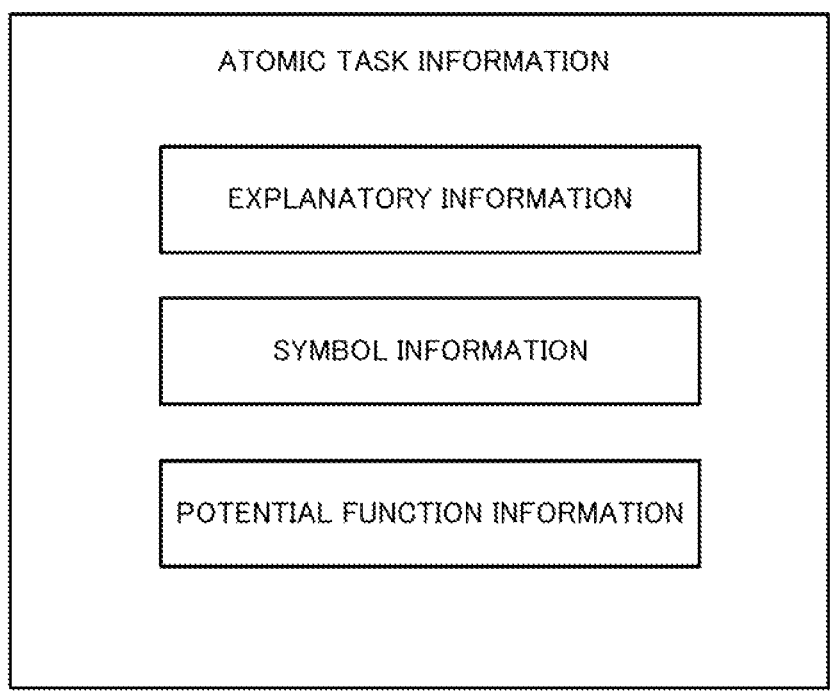
FIG. 3B is an example of the data structure of atomic task information.

FIG. 3B shows an example of the data structure of the atomic task information (first atomic task information to $N_{th}$ atomic task information). As shown in FIG. 3B, the atomic task information mainly includes explanatory information, symbol information, and potential function information, respectively.

The explanatory information is text information describing the content of each atomic task. The explanatory information is used on the task input view to display descriptive text to describe the contents of each atomic task that can be used to specify the task logical expression.

The symbol information indicates the symbol of each atomic task. The above symbol denotes the proposition (also referred to as "atomic proposition") of each atomic task to be used in the task logical expression specified by the user. In other words, symbols indicated by the symbol information are symbols indicating the propositions of the atomic tasks that can be used when the user specifies on the task input view the task logical expression that is the combination of the atomic tasks. Each atomic proposition is a proposition which becomes "1" when the corresponding atomic task is achieved and which becomes "0" when the corresponding atomic task is not achieved.

The potential function information indicates a potential function (referred to as "atomic potential function") corresponding to each atomic task. The atomic potential function is a function that is set to "0" when a corresponding atomic task is accomplished, and set to a value greater than 0 otherwise. It is noted that the objective function supplied to each of the robots 6 by the information processing device 1 through the control signal S3 corresponds to a function obtained by synthesizing atomic potential functions according to the task logical expression.

As described above, each atomic task information (the first atomic task information to the $N_{th}$ atomic task information) registered in the atomic task DB 41 becomes information in which the description of each atomic task and the symbol of the atomic proposition indicative of the each atomic task are associated with the atomic potential function corresponding to the atomic proposition.

[Functional Block]

Figure 4:
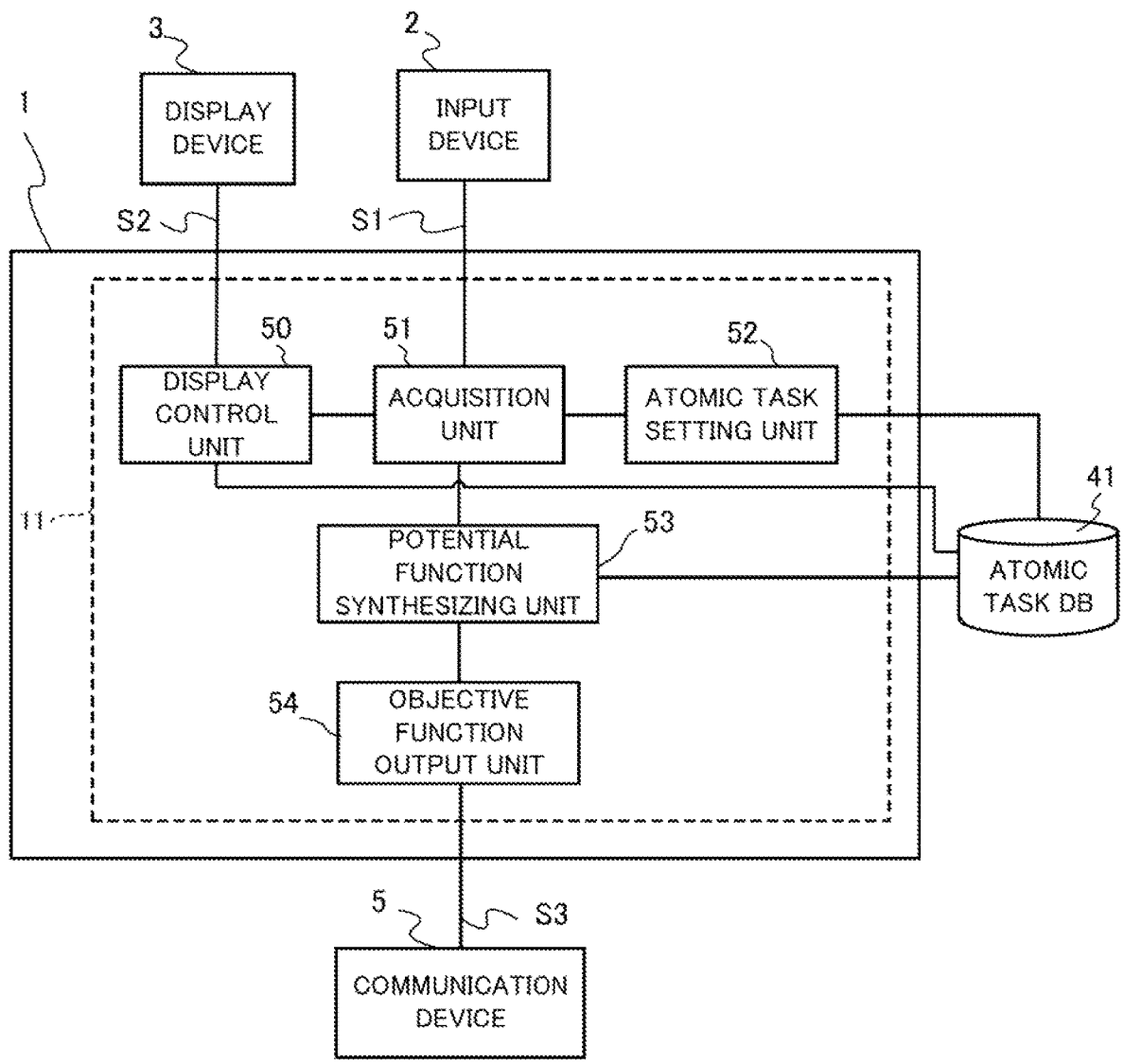
FIG. 4 is an example of a functional block of the information processing device.

FIG. 4 is an example of a functional block of the information processing device 1. The processor 11 of the information processing device 1 functionally includes a display control unit 50, an acquisition unit 51, an atomic task setting unit 52, a potential function synthesizing unit 53, and an objective function output unit 54.

The display control unit 50 refers to the atomic task DB 41 and generates a display signal S2 for displaying the task input view. Then, the display control unit 50 supplies the generated display signal S2 to the display device 3. Further, the display control unit 50 generates a display signal S2 for displaying a view which accepts an input relating to the updating of the atomic task DB 41, and supplies the display signal S2 to the display device 3.

When the task logical expression is inputted on the task input view, the acquisition unit 51 receives an input signal S1 indicating the task logical expression from the input device 2. Then, the acquisition unit 51 supplies the input signal S1 indicating the task logical expression to the potential function synthesizing unit 53. Further, when receiving the input signal S1 relating to updating of the atomic task DB 41 from the input device 2, the acquisition unit 51 supplies the input signal S1 to the atomic task setting unit 52.

The atomic task setting unit 52 updates the atomic task DB 41 when receiving the input signal S1 relating to the update of the atomic task DB 41 from the acquisition unit 51. In this case, for example, the input signal S1 is information indicating addition, change, or deletion of the atomic task information in the atomic task DB 41, and the atomic task setting unit 52 performs addition, change, or deletion of the atomic task information in the atomic task DB 41 based on the input signal S1. It is noted that the input signal S1 indicating the addition of the atomic task information includes the explanatory text of an atomic task, the symbol indicating the corresponding atomic proposition, and the information indicative of the corresponding atomic potential function, respectively, and that the atomic task setting unit 52 generates the atomic task information having such a data structure shown in FIG. 3B based on the above-mentioned information. In this case, the atomic task setting unit 52 registers the generated atomic task information in the atomic task DB 41.

When receiving the input signal S1 indicating the task logical expression from the acquisition unit 51, the potential function synthesizing unit 53 calculates the potential function, in which the atomic potential functions of atomic tasks used in the task logical expression are synthesized based on the task logical expression, with reference to the atomic task DB 41. Then, the potential function synthesizing unit 53 supplies the synthesized potential function to the objective function output unit 54. Details of the processing of the potential function synthesizing unit 53 will be described later.

The objective function output unit 54 determines the objective function for controlling each of the robots 6 to be the potential function outputted by the potential function synthesizing unit 53 as, and transmits the control signal S3 indicating the objective function to each of the robots 6 via the communication device 5.

Each of the robots 6 which has received the control signal S3 performs an operation based on the objective function indicated by the control signal S3. For example, when performing the objective task of jointly capturing one or more objects, each of the robots 6 acquires the position information regarding the objects and the position information regarding each of the robot 6, and determines, on the basis of the objective function indicated by the control signal S3, the control input in the x-direction and y-direction defined on the horizontal plane. In this case, on the basis of the artificial potential field method, each of the robot 6 determines the control input described above so as to move in the direction in which the potential function, which is the objective function, is lowered. Specific examples of the control input will be described later.

Next, a description will be given of the details of the process which the potential function synthesizing unit 53 executes. The potential function synthesizing unit 53 executes a process (also referred to as "first conversion process") of converting atomic propositions in the task logical expression into atomic potential functions, and a process (also referred to as a "second conversion process") of converting logical connectors in the task logical expression into operators applicable to atomic potential functions, respectively.

First, a description will be given of the first conversion process. In the first transformation process, first, the potential function synthesizing unit 53 extracts atomic task information including symbol information indicative of symbols of atomic propositions in the task logical expression from the atomic task DB 41. Then, the potential function synthesizing unit 53 replaces the atomic propositions in the task logical expression by atomic potential functions indicated by the potential function information included in the extracted atomic task information.

Next, a description will be given second conversion process. In the second conversion process, the potential function synthesizing unit 53 converts the logical connectors in the task logical expression into the above-described operators by referring to the correspondence information in which each logical connector is associated in advance with the corresponding operator to be applied to the potential function. The correspondence information is stored in the memory 12 or the storage device 4 in advance.

For example, the potential function synthesizing unit 53 converts the logical connector "∧" indicating the logical AND (logical conjunction) into an addition operator or a maximum value operator. Further, the potential function synthesizing unit 53 converts the logical connector "∨" indicating the logical OR (logical disjunction) into a multiplication operator or a minimum value operator.

For example, it is hereinafter assumed that the atomic proposition for atomic task "A" is denoted by "$\varphi_A$" and its atomic potential function is denoted by "$P_A(x)$", and that the atomic proposition for atomic task "B" is denoted by "$\varphi_B$" and its atomic potential function is denoted by "$P_B(x)$". Here, "x" indicates a variable vector indicating the position and the like of each of the robots 6.

In this case, the potential function synthesizing unit 53 converts the logical expression "$\varphi_A \wedge \varphi_B$" that means "achieving the atomic task A and the atomic task B" according to either of the following expressions (1) or (2).

$$\varphi_A \wedge \varphi_B \Rightarrow P_A(x) + P_B(x) \tag{1}$$

$$\varphi_A \wedge \varphi_B \Rightarrow \max\{P_A(x), P_B(x)\} \tag{2}$$

According to the expression (1) or the expression (2), when both the atomic task A and the atomic task B are achieved (i.e., when the logical expression on the left side is true), the right side of the combination of the atomic potential function $P_A(x)$ and the atomic potential function $P_B(x)$ is 0, which is the smallest value.

The potential function synthesizing unit 53 converts the task logical expression "$\varphi_A \vee \varphi_B$" that means "achieving the atomic task A or the atomic task B" according to either of the following expressions (3) or (4).

$$\varphi_A \vee \varphi_B \Rightarrow P_A(x) \cdot P_B(x) \tag{1}$$

$$\varphi_A \vee \varphi_B \Rightarrow \min\{P_A(x), P_B(x)\} \tag{2}$$

According to the expression (3) or the expression (4), when either the atomic task A or the atomic task B is achieved (i.e., when the logical expression on the left side is true), the right side of the combination of the atomic potential function $P_A(x)$ and the atomic potential function $P_B(x)$ is 0, which is the smallest value.

Hereinafter, the task logical expression "$(\varphi_A \wedge \varphi_B) \vee \varphi_C$" which means "the task A and the task B are accomplished, or the task C is accomplished" is considered, wherein the atomic proposition for atomic task "C" is denoted by "$\varphi_C$" and its atomic potential function is denoted by "$P_C(x)$".

In this case, in the first example, the potential function synthesizing unit 53 converts the task logical expression "$(\varphi_A \wedge \varphi_B) \vee \varphi_C$" using the addition operator and the multiplication operator according to the expressions (1) and (3) as shown in the following expression (5).

$$(\varphi_A \wedge \varphi_B) \vee \varphi_C \Rightarrow (P_A(x) + P_B(x)) \cdot P_C(x) \tag{5}$$

In the second example, the potential function synthesizing unit 53 converts the task logical expression "$(\varphi_A \wedge \varphi_B) \vee \varphi_C$" using the maximum value operator and the minimum value operator according to the expressions (2) and (4) as shown in the following expression (6).

$$(\varphi_A \wedge \varphi_B) \vee \varphi_C \Rightarrow \min\{\max\{P_A(x), P_B(x)\}, P_C(x)\} \quad (6)$$

It is noted that the potential function synthesizing unit 53 may convert the task logical expression according to either the combination of the expression (1) and the expression (4) or the combination of the expression (2) and the expression (3) instead of the conversion according to the expression (5) or the expression (6).

Instead of the conversion of the logical connector in the task logical expression according to the expressions (1) to (4), for example, the potential function synthesizing unit 53 may convert the logical connector in the task logical expression according to the following expression (4.5).

$$M(x) = \begin{cases} 0 & (p < 0 \wedge (P_A(x) = 0 \vee P_B(x) = 0)) \\ (P_A^p(x) + P_B^p(x))^{\frac{1}{p}} & \text{OTHER} \end{cases} \quad (4.5)$$

"M(x)" corresponds to both transformations of the logical expressions "$\varphi_A \wedge \varphi_B$" and "$\varphi_A \vee \varphi_B$", and "p" denotes a parameter. The task logical expression "$\varphi_A \vee \varphi_B$" can be converted into the expression (4.5) in case of "p<0", and the task logical expression "$\varphi_A \wedge \varphi_B$" can be converted into the expression (4.5) in case of "p>0". Therefore, the potential function synthesizing unit 53 sets the parameter p to "p>0" when applying the conversion shown in the expression (4.5) to the logical expression "$\varphi_A \wedge \varphi_B$", and sets the parameter p to "p<0" when applying the conversion shown in the expression (4.5) to the logical expression "$\varphi_A \vee \varphi_B$".

A further consideration will be given of the expression (4.5). When "p=1" is set, the conversion of the logical expression "$\varphi_A \wedge \varphi_B$" including the logical AND according to the expression (4.5) matches the expression (1). When "p=∞" is set, the conversion of the logical expression "$\varphi_A \wedge \varphi_B$" including the logical AND according to the expression (4.5) matches the expression (2). If "p>0" is set and both the atomic task A and the atomic task B are achieved, M(x) for the logical expression $\varphi_A \wedge \varphi_B$ is 0, which is the smallest.

On the other hand, when "p=-∞" is set, the conversion of the logical expression "$\varphi_A \vee \varphi_B$" including the logical OR according to the expression (4.5) matches the expression (4). When "p=-1" is set, the conversion of the logical expression "$\varphi_A \vee \varphi_B$" including the logical OR according to the expression (4.5) is expressed by the following expression.

$$\phi_A \vee \phi_B \Rightarrow \frac{P_A(x) \cdot P_B(x)}{P_A(x) + P_B(x)}$$

If the denominator of the above expression is ignored, this transformation is consistent with the expression (3). In the case of "p<0", when either the atomic task A or the atomic task B is achieved, M(x) for the logical expression "$\varphi_A \vee \varphi_B$" is 0, which is the smallest.

In this way, by using the above-described expressions (1) to (4) or (4.5), the potential function synthesizing unit 53 can appropriately set an objective function for controlling each of the robots 6 by converting an arbitrary task logical expression specified by the user into an arithmetic expression of the atomic potential function. It is noted that the task logical expression may include a logical connector other than the logical AND or the logical OR such as an exclusive OR. Even in this case, for example, the potential function synthesizing unit 53 converts the exclusive OR the like into the combination of the logical AND, the logical OR, and the logical negation and thereafter performs the above-mentioned second conversion process. For an atomic proposition with the logical negation, for example, the potential function synthesizing unit 53 converts the atomic potential function corresponding to the atomic proposition into the inverse thereof.

SPECIFIC EXAMPLE

Next, a specific example of processing based on the functional block of the information processing device 1 shown in FIG. 4 will be described.

Figure 5:
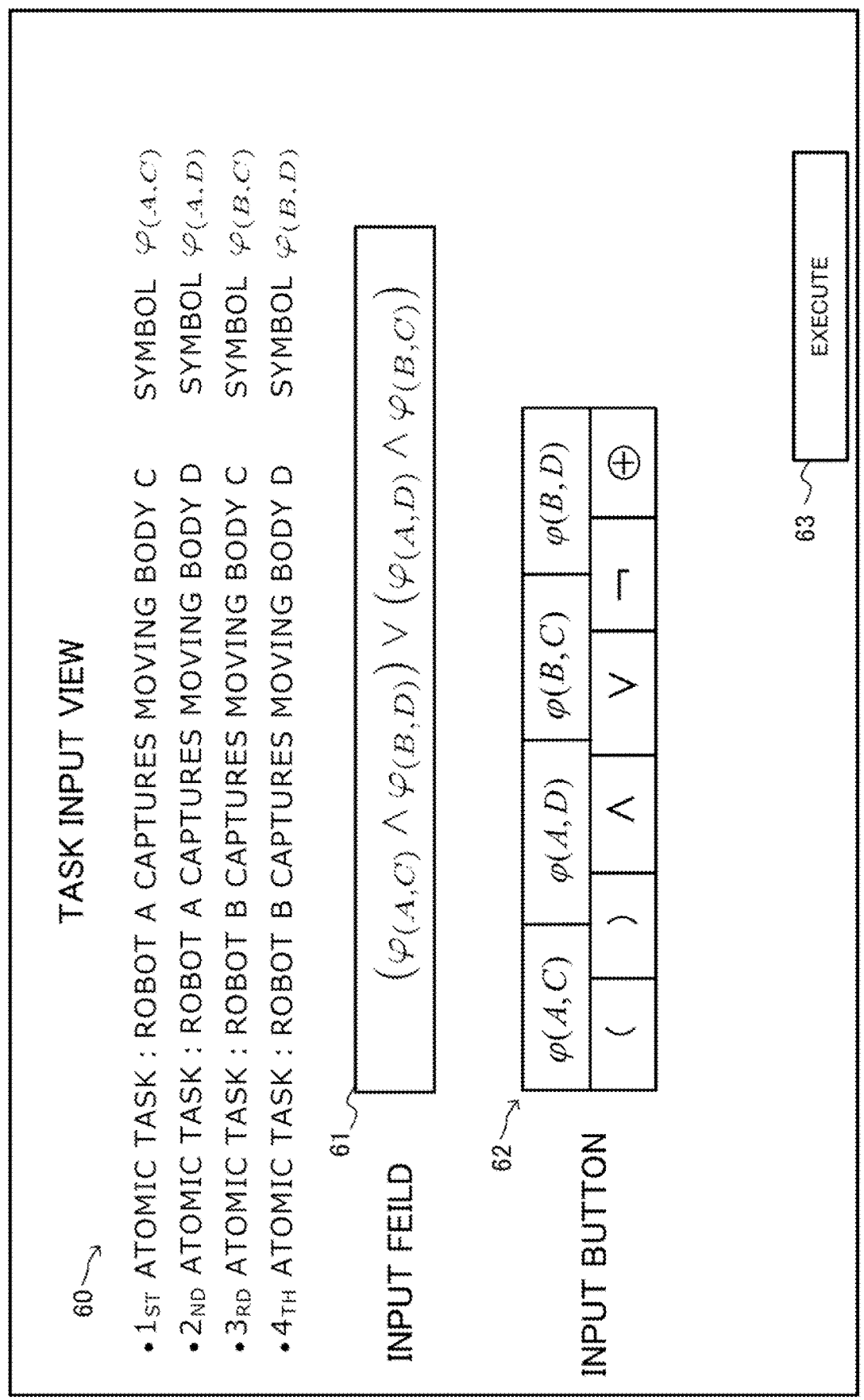
FIG. 5 is an example of a task input view displayed by a display device.

FIG. 5 is an example of a task input view displayed by the display device 3. In this case, for example, the display control unit 50 of the information processing device 1 generates the display signal S2 for displaying the task input view shown in FIG. 5 when the acquisition unit 51 acquires the input signal S1 indicating the display request of the task input view from the input device 2, and transmits the display signal S2 to the display device 3. Then, in the example of FIG. 5, the display control unit 50 displays on the task input view an atomic task explanation area 60, a task logical expression input field 61, input buttons 62, and an execution button 63.

The atomic task description area 60 is an area that describes the atomic tasks to be performed by the robots 6. The display control unit 50 displays explanatory sentences relating to the contents of the four atomic tasks (the first atomic task to the fourth atomic task) in association with the corresponding symbols (atomic propositions) on the basis of explanatory information and symbol information respectively included in the four pieces of the atomic task information recorded in the atomic task DB 41. Thus, the viewer of the task input view can appropriately grasp the correspondence relationship between the contents of the first atomic task to the fourth atomic task and their symbols (atomic propositions) to be used for inputting the task logical expression.

The task logical expression input field 61 is an input field of the task logical expression, and the input buttons 62 are buttons for inputting atomic propositions, logical connectors, and other symbols in the task logical expression input field 61. The display control unit 50 displays, as the input buttons 62, buttons corresponding to "$\varphi(A, C)$", "$\varphi(A, D)$", "$\varphi(B, C)$", "$\varphi(B, D)$" each of which is a symbol (atomic proposition) corresponding to each of the first atomic task to the fourth atomic task, and buttons corresponding to logical connectors. Thus, the viewer can suitably specify the task logical expression for instructing the complex task that is a combination of the atomic tasks. Instead of the input operation by selecting the buttons in the task logic input field 61, the viewer may input the task logical expression by other operations such as keyboard operation or voice operation.

When detecting that the execution button 63 has been selected, the acquisition unit 51 supplies the information regarding the task logical expression inputted in the task logical expression input field 61 to the potential function synthesizing unit 53. In the task input view shown in FIG.

5, the task logical expression shown in the following expression (7) is inputted in the task logical expression input field 61.

$$(\varphi(A, C) \wedge \varphi(B, D)) \vee (\varphi(A, D) \wedge \varphi(B, C)) \qquad (7)$$

In this case, with reference to the atomic task DB 41, the potential function synthesizing unit 53 synthesizes the atomic potential functions by performing the first conversion process and the second conversion process on the task logical expression inputted to the task logical expression input field 61.

Here, a description will be given of the first conversion process according to the expression (7). Given that "$p_a$" denotes the coordinates of the robot A, "$p_b$" denotes the coordinates of the robot B, "$p_c$" denotes the coordinates of the moving object C, and "$p_d$" denotes the coordinates of the moving object D, the atomic proposition φ (A, C) corresponding to the first atomic task is converted, for example, to the atomic potential function "$P_{(A, C)} (p_a)$" corresponding to the square of the distance between the robot A and the moving object C, as shown in the following expression (8).

$$\varphi(A, C) \Rightarrow P_{(A,C)}(p_a) = \|p_c - p_a\|^2 \qquad (8)$$

The atomic propositions φ(B, D), φ (A, D), and φ (B, C) corresponding to the second atomic task to the fourth atomic task are similarly converted to the atomic potential functions "$P_{(B, D)} (p_b)$", "$P_{(A, D)} (p_a)$", "$P_{(B, C)}(p_b)$" shown in the following expressions (9) to (11), respectively.

$$\varphi(B, D) \Rightarrow P_{(B,D)}(p_b) = \|p_d - p_b\|^2 \qquad (9)$$

$$\varphi(A, D) \Rightarrow P_{(A,D)}(p_b) = \|p_d - p_a\|^2 \qquad (10)$$

$$\varphi(B, C) \Rightarrow P_{(B,C)}(p_b) = \|p_c - p_b\|^2 \qquad (11)$$

It is noted that the atomic potential functions "$P_{(A, C)} (p_a)$", "$P_{(B, D)} (p_b)$", "$P_{(A, D)} (p_a)$", "$P_{(B, C)} (p_b)$" are recorded in the atomic task DB 41 as the potential function information included in the atomic task information corresponding to the first atomic task to the fourth atomic task.

Further, the potential function synthesizing unit 53 calculates the objective function "P ($p_a$, $p_b$)", which is a combination of atomic potential functions, by further performing the second conversion process for each logical connector in the expression (7). Specifically, the potential function synthesizing unit 53 calculates the objective function shown in the following expression (12).

$$P(p_a, p_b) = (P_{(A,C)}(p_a) + P_{(B,D)}(p_d)) \cdot (P_{(A,D)}(p_a) + P_{(B,C)}(p_b)) \qquad (12)$$

Then, the objective function output unit 54 transmits the control signal S3 indicating the objective function shown in the expression (12) to each of the robots 6 via the communication device 5. Then, the robot A and the robot B autonomously move based on the objective function specified by the control signal S3 and the most recently updated coordinates $p_a$, $p_b$, $p_c$, $p_d$.

For example, a description will be given of the case where each of the robots 6 can freely determine the own velocity through the control input. In this case, when the control input for the robot A is set to "$u_a$" and the control input for the robot B is set to "$u_b$", the derivative (i.e., movement velocity) of the position of the robot A and the robot B is determined by the control inputs $u_a$ and $u_b$ as shown in the following expressions (13) and (14).

$$\dot{p}_a = u_a \qquad (13)$$

$$\dot{p}_b = u_b \qquad (14)$$

Here, each of the control inputs $u_a$ and $u_b$ is set to the partial differential (i.e., an artificial force field corresponding to the gradient of the potential function) of the objective function P ($p_a$, $p_b$) shown in the expression (12). Specifically, the control inputs $u_a$ and $u_b$ are determined based on the following expressions (15) and (16).

$$u_a = -\frac{\partial P}{\partial p_a}(p_a, p_b) \qquad (15)$$

$$u_b = -\frac{\partial P}{\partial p_b}(p_a, p_b) \qquad (16)$$

In this way, the robot A and the robot B can move so that the objective function P ($p_a$, $p_b$) is reduced, and the objective task specified through the task logical expression can be preferably executed.

[Processing Flow]

Figure 6:
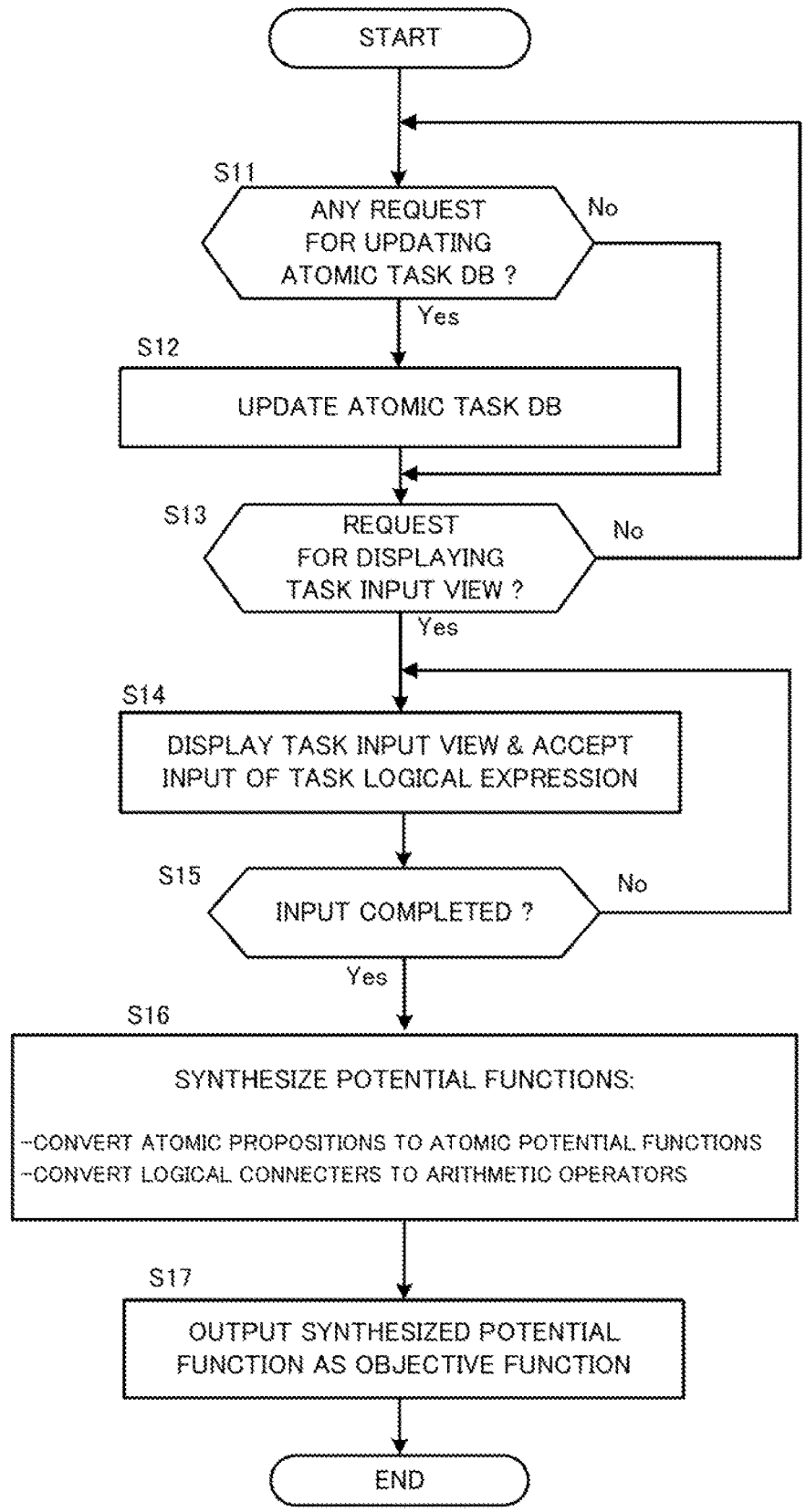
FIG. 6 is an example of a flowchart executed by the information processing device according to a first example embodiment.

FIG. 6 is an example of a flow chart in which the information processing device 1 according to the first example embodiment executes. The information processing device 1 repeatedly executes the processing of the flowchart shown in FIG. 6.

First, the atomic task setting unit 52 of the information processing device 1 determines whether or not there is a request for updating the atomic task DB 41 (Step S11). In this case, for example, the atomic task setting unit 52 determines whether or not the acquisition unit 51 has received from the input device 2 an input signal S1 indicating a user input relating to addition, change, or deletion of the atomic task information which is recorded in the atomic task DB 41. When there is a request for updating the atomic task DB 41 (Step S11; Yes), the atomic task setting unit 52 updates the atomic task DB 41 based on the input signal S1 supplied from the input device 2 (Step S12). In this case, the atomic task setting unit 52 performs the addition, the change, or the delete operation on the atomic task information which is recorded in the atomic task DB 41. On the other hand, when there is no request for updating the atomic task DB 41 (Step S11; No), the information processing device 1 advances the processing to Step S13.

Next, the display control unit 50 of the information processing device 1 determines whether or not there is a display request of the task input view (Step S13). In this case, the display control unit 50 determines whether or not the acquisition unit 51 has received from the input device 2 an input signal S1 indicating a user input to request a display of the task input view, for example. When it is determined that there is a display request of the task input view (Step S13; Yes), the display control unit 50 generates the display signal S2 relating to the task input view and supplies the display signal S2 to the display device 3, thereby causing the display device 3 to display the task input view (Step S14). In this case, the acquisition unit 51 accepts the input of the task logical expression on the task input view. On the other hand, when it is determined that there is no display request of the task input view (Step S13; No), the information processing device 1 returns the processing to Step S11.

Next, the acquisition unit 51 determines whether or not the input of the task logical expression on the task input view has been completed (Step S15). When the input of the task logical expression on the task input view has not been completed (Step S15: No), the acquisition unit 51 continuously accepts the input of the task logical expression on the task input view at Step S14.

On the other hand, when the input of the task logical expression on the task input view has been completed (Step S15; Yes), the potential function synthesizing unit 53 of the information processing device 1 refers to the atomic task DB 41 and synthesizes the potential functions (Step S16). In this case, the potential function synthesizing unit 53 performs a first conversion process of converting the atomic propositions included in the input task logical expression into atomic potential functions, and a second conversion process of converting the logical connectors included in the input task logical expression into arithmetic operators applicable to the atomic potential functions.

Then, the objective function output unit 54 of the information processing device 1 outputs the potential function synthesized by the potential function synthesizing unit 53 at Step S16 as an objective function (Step S17). For example, the objective function output unit 54 transmits a control signal S3 indicating the above-described objective function to each of the robots 6 via the communication device 5.

In this way, the information processing device 1 automatically designs the objective function for executing the objective task based on the artificial potential field method from the task logical expression represented by the combination of the propositions of the atomic tasks and the logical connectors. This makes it possible for the user to easily design the objective function in accordance with the contents of a complicated work, which had not been able to be designed until now without specialists.

[Modification]

The following modifications may be applied to the example embodiments described above in arbitrary combination.

(First Modification)

The information processing device 1 may determine the objective function in consideration of the priority set for each atomic task.

For example, it is assumed that the degree of the priority of the task A corresponding to the atomic proposition "$\varphi_A$" is "$\alpha$" and the degree of the priority of the task B corresponding to the atomic proposition "$\varphi_B$" is "$\beta$", respectively. The degrees of the priorities a and 13 shall be equal to or greater than 0, respectively, and the larger the degree thereof, the higher the priority becomes. In this case, instead of using the expression (1), the potential function synthesizing unit 53 converts the logical expression "$\varphi_A \wedge \varphi_B$" related to the logical AND based on the following expression (17).

$$\varphi_A \wedge \varphi_B \Rightarrow \alpha \cdot P_A(x) + \beta \cdot P_B(x) \tag{17}$$

In this way, the potential function synthesizing unit 53 multiplies each atomic potential function by the degree of the priority of the corresponding atomic task when converting the logical AND into an addition operator. This allows the potential function synthesizing unit 53 to weight each atomic potential function in accordance with the priority and facilitate early execution of higher priority atomic tasks.

Further, the potential function synthesizing unit 53, instead of using the expression (3), converts the logical expression "$\varphi_A \vee \varphi_B$" corresponding to the logical OR based on the following expression (18).

$$\varphi_A \vee \varphi_B \Rightarrow P_A^\alpha(x) \cdot P_B^\beta(x) \tag{18}$$

In this way, the potential function synthesizing unit 53, when converting the logical OR into a multiplication operator, sets the degree of the priority of the atomic task to the exponent of the corresponding atomic potential function. This allows the potential function synthesizing unit 53 to weight each atomic potential function in accordance with the priority and facilitate early execution of higher priority atomic tasks.

When converting the logical expression "$\varphi_A \wedge \varphi_B$" corresponding to the logical AND using the maximum value operator (see the expression (2)), the potential function synthesizing unit 53 multiplies each atomic potential function by the degree of the priority of the corresponding atomic task, for example, as shown in the following expression (19).

$$\varphi_A \wedge \varphi_B \Rightarrow \max\{\alpha \cdot P_A(x), \beta \cdot P_B(x)\} \tag{19}$$

This also allows the potential function synthesizing unit 53 to weight each atomic potential function in accordance with the priority and facilitate early execution of higher priority atomic tasks.

Similarly, when converting the logical expression "$\varphi_A \vee \varphi_B$" corresponding to the logical AND using the minimum value operator (see the expression (4)), the potential function synthesizing unit 53 multiplies each corresponding atomic potential function by the inverse of the degree of the priority of the corresponding atomic task, for example, as shown in the expression (20) below.

$$\varphi_A \vee \varphi_B \Rightarrow \min\left\{\frac{1}{\alpha} P_A(x), \frac{1}{\beta} P_B(x)\right\} \tag{20}$$

Even in this case, the potential function synthesizing unit 53 also performs weighting corresponding to the priority for each atomic potential function and prioritizes the execution of higher priority atomic tasks.

Figure 7:
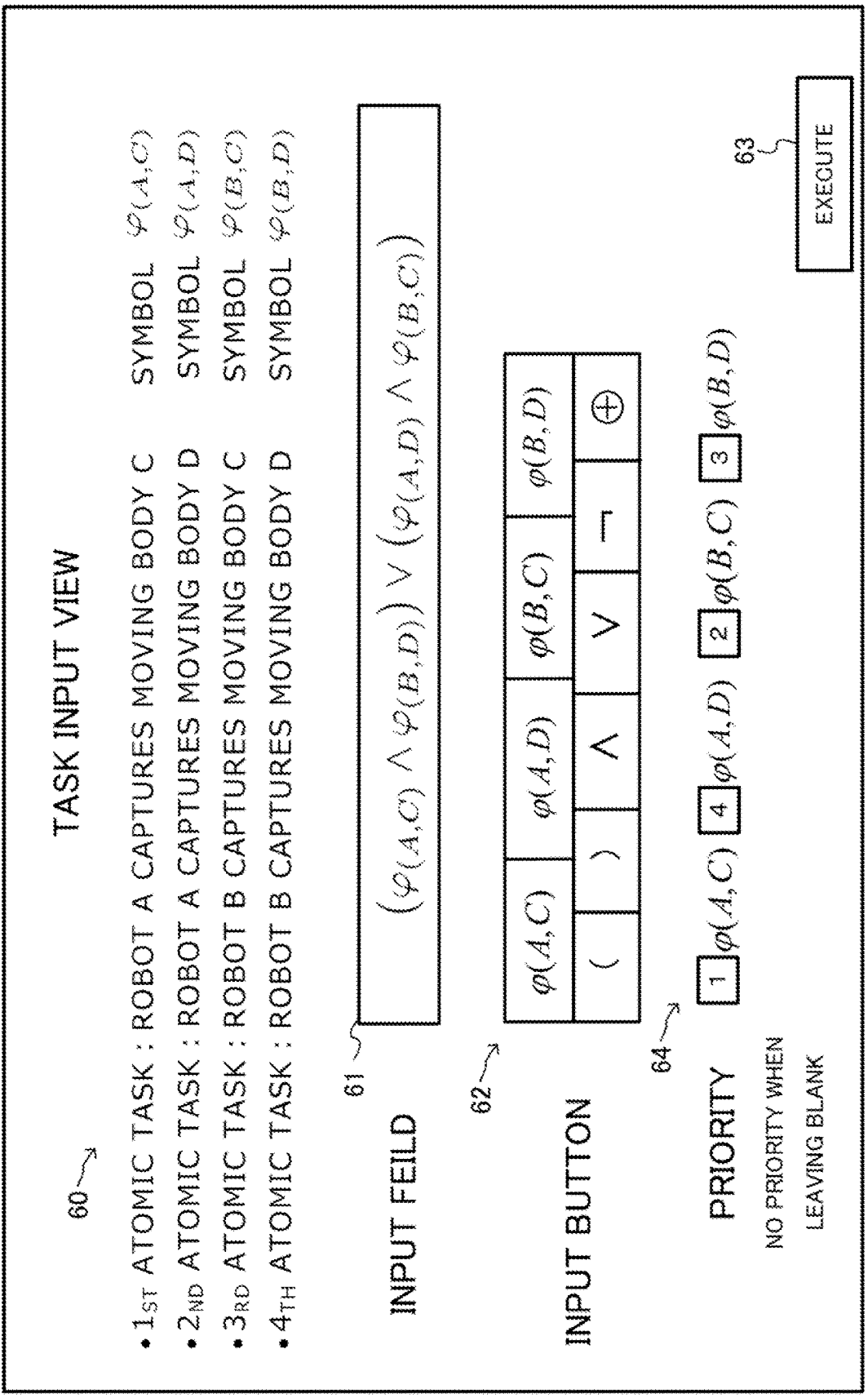
FIG. 7 is a display example of a task input view according to a modification.

The information processing device 1 may determine the degree of the priority to be set for each atomic task based on the user input. FIG. 7 is a display example of a task input view according to this modification.

As shown in FIG. 7, the display control unit 50 displays priority ranking designation fields 64 for giving a priority ranking to each atomic task on the task input view. Each of the priority ranking designation fields 64 is provided corresponding to each of the four atomic tasks (the first atomic task to the fourth atomic task), and accepts the designation of the priority ranking for the corresponding atomic task. In the example of FIG. 7, the ranking of the first atomic task "φ (A, C)" is the highest priority ranking (first ranking), and the ranking of the second atomic task "φ (A, D)" is the lowest priority ranking (fourth ranking).

When the execution button 63 is selected, the potential function synthesizing unit 53 determines the degree of the priority of each atomic task based on the priority ranking of each atomic task designated in the corresponding priority specification field 64. In this case, the potential function synthesizing unit 53 determines the degree of the priority of each atomic task so that the higher the priority ranking is, the larger the degree of the priority becomes, based on predetermined rules or by referring to a predetermined table and the like.

In this way, according to the task input view shown in FIG. 7, the priority ranking of each atomic task to be used can be suitably specified by the user. Instead of the priority ranking designation field 64, the display control unit 50 may display an input field of the degree of the priority for each atomic task on the task input view and accept the specification of the degree of the priority of each atomic task.

Second Modification

In the second conversion process, the potential function synthesizing unit 53 may associate the logical AND with the average value of the tasks, instead of simply replacing the logical AND with the addition operator as shown in the expression (1).

For example, the potential function synthesizing unit 53 may convert the logical AND "$\varphi_A \wedge \varphi_B \wedge \varphi_C$" of the proposition "$\varphi_A$" of the atomic task A, the proposition "$\varphi_B$" of the atomic task B, and the proposition "$\varphi_C$" of the atomic task C according to the following expression (21).

$$\varphi_A \wedge \varphi_B \wedge \varphi_C \Rightarrow \frac{1}{3}(P_A(x) + P_B(x) + P_C(x)) \quad (21)$$

In this case, the potential function synthesizing unit 53 determines the logical AND to be the average of the atomic tasks and calculates the average value of the corresponding atomic potential functions. The potential function synthesizing unit 53 similarly calculates the average value of the corresponding atomic potential functions for the logical AND of two or more than three atomic propositions.

Similarly, the potential function synthesizing unit 53 may convert the logical OR "$\varphi_A \vee \varphi_B \vee \varphi_C$" according to the following expression (22).

$$\varphi_A \vee \varphi_B \vee \varphi_C \Rightarrow (P_A(x) \cdot P_B(x) \cdot P_C(x))^{\frac{1}{3}} \quad (22)$$

In this case, the potential function synthesizing unit 53 determines the logical OR to be the geometric average of the atomic tasks and calculates the geometric average of the corresponding atomic potential functions. The potential function synthesizing unit 53 similarly calculates the geometric average of the corresponding atomic potential functions for the logical OR of two or more than three atomic propositions.

Even when the conversions of the logical AND the logical OR are performed in this way, the information processing device 1 can suitably derive the objective function that defines the operation of each of the robots 6 from the task logical expression specified by the user.

Third Modification

Examples of robot models in which the artificial potential field method can be used are not limited to the robot model in which the derivative (i.e., velocity) of the position is used as the control input, as shown in the expressions (13) and (14). Alternatively, for example, it may be a robot model in which the acceleration is used as the control input. The detail of the example of the above-mentioned robot model is described in Non-Patent Literature 1, for example.

Fourth Modification

Instead of transmitting the control signal S3 indicating the objective function to each of the robots 6, the information processing device 1 may transmit a control signal S3 indicating the control input determined from the objective function to each of the robots 6.

Figure 8:
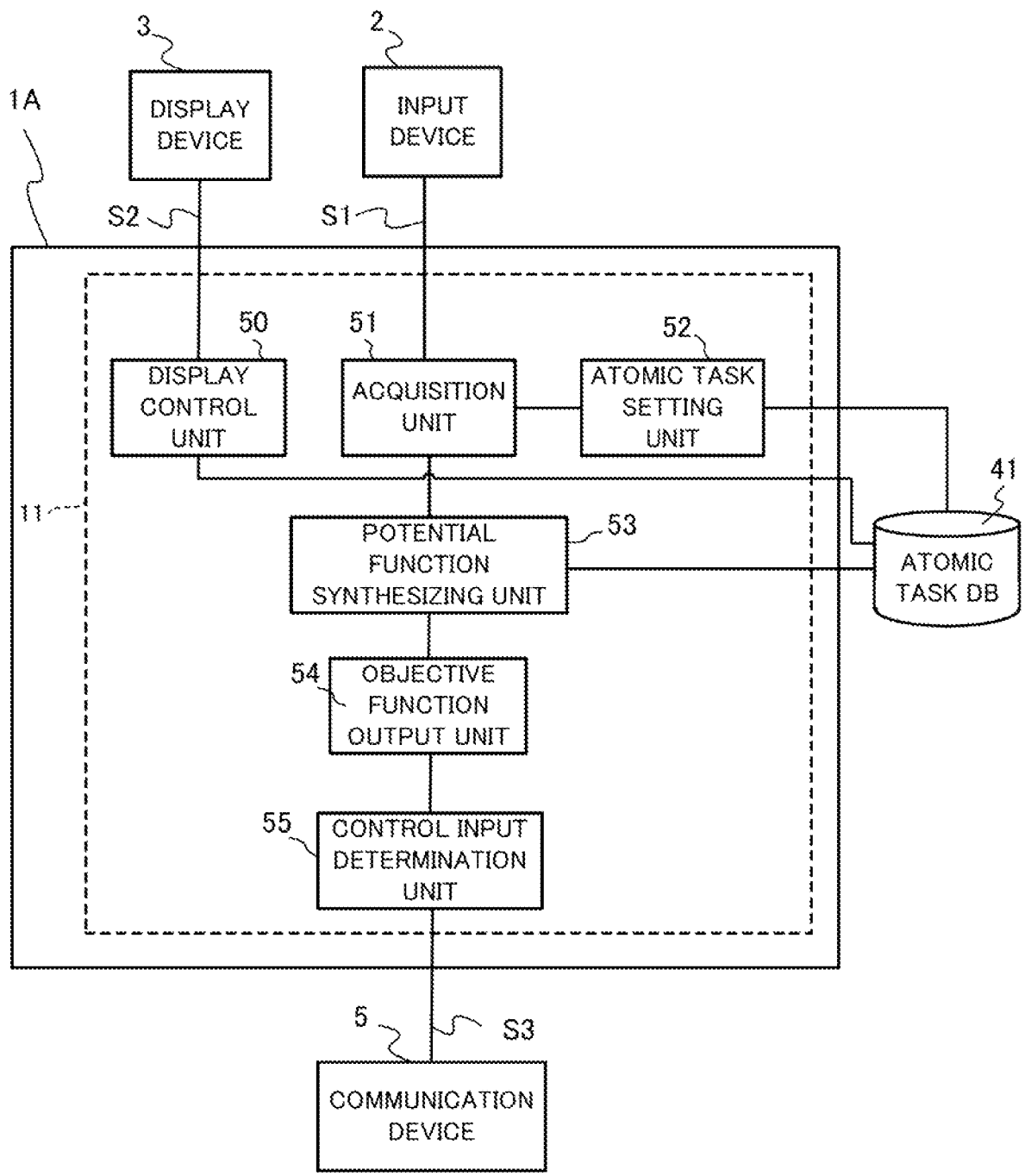
FIG. 8 is an example of a functional block of the information processing device which transmits a control signal indicating a control input according to the modification.

FIG. 8 is an example of a functional block of an information processing device 1A that transmits a control signal S3 indicating a control input. The processor 11 of the information processing device 1 shown in FIG. 8 includes a control input determination unit 55. The control input determination unit 55 determines the control input to be inputted to each of the robots 6, based on the objective function outputted by the objective function output unit 54 and the position information regarding each of the robots 6 and the like. Then, the control input determination unit 55 transmits the control signal S3 indicating the control input to each of the robots 6 via the communication device 5. In this case, for example, the control input determining unit 55 receives the position information or the like regarding each of the robots 6 from each of the robots 6 via the communication device 5. In another example, the control input determination unit 55 is electrically connected to sensors such as a camera and a range measurement sensor and measures or estimates the position and the like regarding each of the robots 6, based on the detection signal outputted by the sensors.

In this way, even in such a mode that the information processing device 1 determines the control input to be inputted to each of the robots 6 and transmits the control signal S3 indicative of the control input to each of the robots 6, the information processing device 1 can suitably make each of the robots 6 perform the objective task.

Fifth Modification

Each of the robot 6 may have one or more functions which the information processing device 1 has instead.

For example, the information processing device 1 may transmit the control signal S3 indicating the task logical expression to each of the robots 6, and each of the robots 6 may generate an objective function based on the task logical expression specified by the control signal S3 and autonomously move based on the objective function. In this case, each of the robots 6 are configured to be capable of storing or referring to the atomic task DB 41, and have functions corresponding to the acquisition unit 51, the potential function synthesizing unit 53, and the objective function output unit 54 which are shown in the functional block in FIG. 4. In this case, each of the robots 6 acquires the control signal S3 indicating the task logical expression from the information processing device 1. Then, as with the potential function synthesizing unit 53, each of the robots 6 refers to the atomic task DB 41 and executes the first conversion process and the second conversion process described above for the specified task logical expression to thereby synthesize the atomic potential functions. Then, as with the objective function output unit 54, each of the robots 6 outputs the synthesized atomic potential function as an objective function to another functional block in the robot 6 for calculating an artificial force field based on the artificial potential field method.

Sixth Modification

The process performed by the atomic task setting unit 52 described in FIG. 4 may be performed by a device other than the information processing device 1. In this case, the above-described device can refer to and update the atomic task DB 41, and update the atomic task DB 41 based on the user input of the input device 2 or other input device.

Seventh Modification

Only one robot 6 may be the execution subject (i.e., the control target) of the objective task although a plurality of robots 6 are the execution subjects of the objective task in the configuration example of the robot control system 100 illustrated in FIG. 1. Even in this case, the information processing device 1 can receive the input of the task logical expression which expresses the complex objective task for one robot 6 by the combination of the atomic tasks, and appropriately output the corresponding objective function.

Second Example Embodiment

Figure 9:
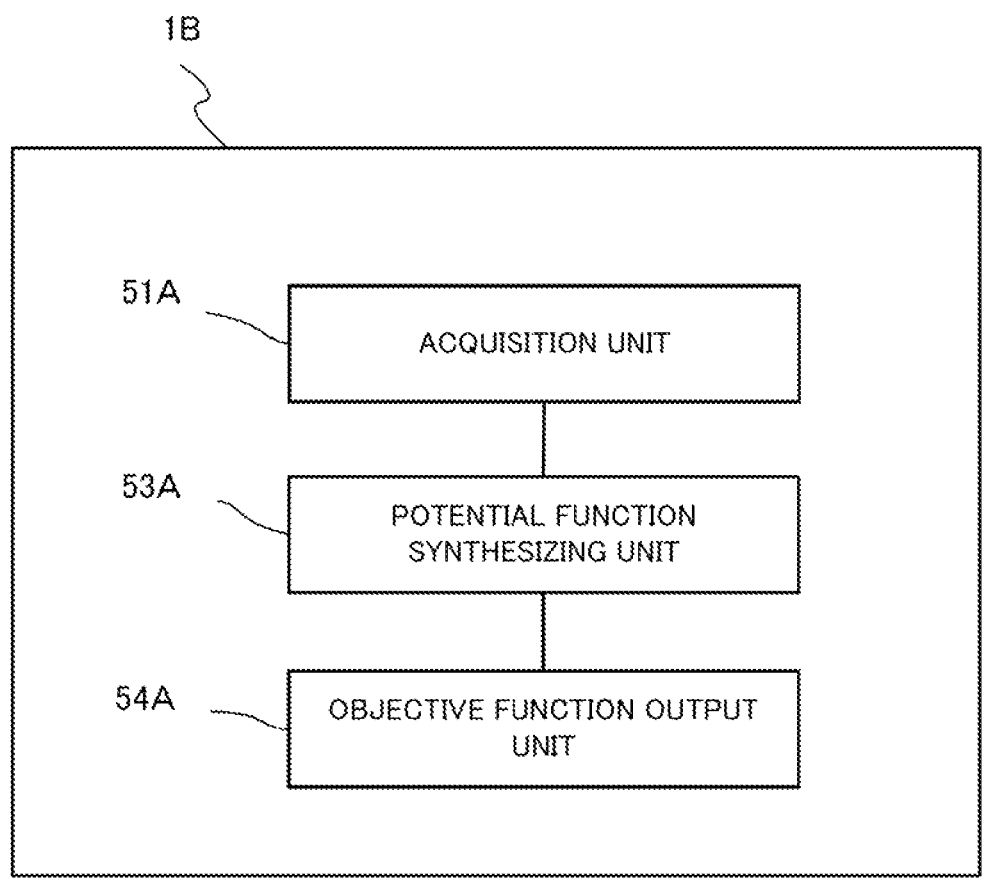
FIG. 9 is a functional block diagram of an information processing device according to a second example embodiment.

FIG. 9 is a functional block diagram of the information processing device 1B according to the second example embodiment. As shown in FIG. 9, the information processing device 1B mainly includes an acquisition unit 51A, a potential function synthesizing unit 53A, and an objective function output unit 54A.

The acquisition unit 51A acquires a task logical expression in which an objective task to be performed by a robot is expressed by a combination of a plurality of atomic tasks. The potential function synthesizing unit 53A synthesizes (combines) atomic potential functions, each of which is a potential function corresponding to each of the atomic tasks, based on the task logical expression. The objective function output unit 54A outputs an atomic potential function synthesized based on the task logical expression as an objective function for controlling the robot.

The information processing device 1B according to the second example embodiment outputs the objective function for controlling a robot by synthesizing the atomic potential function corresponding to each of atomic tasks when the task logical expression in which the objective task is indicated by the combination of the atomic tasks is acquired. Thereby, the information processing device 1B can easily design the objective function according to the contents of the complicated work in the control of the robot using the artificial potential field method.

The whole or a part of the example embodiments described above (including modifications, the same applies hereinafter) can be described as, but not limited to, the following Supplementary Notes.

[Supplementary Note 1]
An information processing device comprising:
an acquisition unit configured to acquire a logical expression in which an objective task to be performed by a robot is expressed by a combination of a plurality of tasks;
a potential function synthesizing unit configured to synthesize atomic potential functions, each of which is a potential function corresponding to each of the tasks, based on the logical expression; and
an objective function output unit configured to output a potential function synthesized based on the logical expression as an objective function for controlling the robot.

[Supplementary Note 2]
The information processing device according to Supplementary Note 1,
wherein the potential function synthesizing unit is configured to determine the atomic potential functions to be synthesized by referring to task information stored in a storage unit, the task information associating each of the tasks with a corresponding atomic potential function.

[Supplementary Note 3]
The information processing device according to Supplementary Note 1 or 2,
wherein, when synthesizing the atomic potential functions based on the logical expression, the potential function synthesizing unit is configured to convert a logical connector included in the logical expression to an arithmetic operator for performing an operation of the atomic potential functions.

[Supplementary Note 4]
The information processing device according to Supplementary Note 3,
wherein, when converting the logical connector to the arithmetic operator, the potential function synthesizing unit is configured to convert a logical conjunction to an addition operator or a maximum value operator and convert a logical disjunction to a multiplication operator or a minimum value operator.

[Supplementary Note 5]
The information processing device according to any one of Supplementary Notes 1 to 4,
wherein the objective task is performed by a plurality of robots jointly, and
wherein each of the tasks is to be performed by one of the robots.

[Supplementary Note 6]
The information processing device according to any one of Supplementary Notes 1 to 5,
wherein the acquisition unit is configured to acquire the logical expression by at least accepting an input which specifies a proposition corresponding to each of the tasks and a logical connector for the proposition.

[Supplementary Note 7]
The information processing device according to any one of Supplementary Notes 1 to 6, further comprising
a display control unit configured to display a symbol indicative of a proposition corresponding to each of the tasks and explanation of the each of the tasks indicated by the symbol,
wherein the acquisition unit is configured to acquire the logical expression by at least accepting an input which specifies the symbol indicative of the proposition corresponding to each of the tasks and a logical connector for the proposition.

[Supplementary Note 8]
The information processing device according to any one of Supplementary Notes 1 to 7,
wherein the acquisition unit is configured to further acquire a priority of each of the tasks, and
wherein the potential function synthesizing unit is configured to synthesize the atomic potential functions based on the logical expression and the priority.

[Supplementary Note 9]

The information processing device according to Supplementary Note 8, wherein, when converting a logical conjunction between a first task and a second task included in the tasks to an addition operator, the potential function synthesizing unit is configured to multiply an atomic potential function corresponding to the first task by the priority of the first task and multiply an atomic potential function corresponding to the second task by the priority of the second task.

[Supplementary Note 10]

The information processing device according to Supplementary Note 8, wherein, when converting a logical disjunction between a first task and a second task included in the tasks to a multiplication operator, the potential function synthesizing unit is configured to set the priority of the first task as an exponent of an atomic potential function corresponding to the first task and set the priority of the second task as an exponent of an atomic potential function corresponding to the second task.

[Supplementary Note 11]

The information processing device according to Supplementary Note 1 or 2, wherein, provided that atomic potential functions corresponding to any two of the tasks are denoted by "$P_A(x)$" and "$P_B(x)$", respectively, the potential function synthesizing unit is configured to convert, by use of a parameter "p", a logical conjunction between the two of the tasks and a logical disjunction between the two of the tasks to $$\begin{cases} 0 & (p < 0 \wedge (P_A(x) = 0 \vee P_B(x) = 0)) \\ (P_A^p(x) + P_B^p(x))^{\frac{1}{p}} & \text{OTHER} \end{cases},$$

wherein the parameter is set to "p>0" in case of conversion of the logical conjunction and the parameter is set to "p<0" in case of conversion of the logical disjunction.

[Supplementary Note 12]

A control method executed by an information processing device, the control method comprising:

acquiring a logical expression in which an objective task to be performed by a robot is expressed by a combination of a plurality of tasks;

synthesizing atomic potential functions, each of which is a potential function corresponding to each of the tasks, based on the logical expression; and outputting a potential function synthesized based on the logical expression as an objective function for controlling the robot.

[Supplementary Note 13]

A storage medium storing a program executed by a computer, the program causing the computer to function as:

an acquisition unit configured to acquire a logical expression in which an objective task to be performed by a robot is expressed by a combination of a plurality of tasks;

a potential function synthesizing unit configured to synthesize atomic potential functions, each of which is a potential function corresponding to each of the tasks, based on the logical expression; and an objective function output unit configured to output a potential function synthesized based on the logical expression as an objective function for controlling the robot.

While the invention has been particularly shown and described with reference to example embodiments thereof, the invention is not limited to these embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A, 1B Information processing device
2 Input device
3 Display device
4 Storage device
5 Communication device
6, 6A, 6B robots
41 Atomic task DB
100 Robot control system

What is claimed is:

1. An information processing device comprising:
a memory configured to store a program; and
a processor configured to execute the program to:
acquire a logical expression in which an objective task to be performed by a robot is expressed by a combination of a plurality of tasks;
synthesize a plurality of potential functions corresponding to the plurality of tasks, based on the logical expression;
output a first potential function synthesized based on the logical expression as an objective function for controlling the robot; and
cause the robot to perform a first task associated with the first potential function,
wherein the processor is further configured to synthesize the plurality of potential functions based on the logical expression by converting a logical connector included in the logical expression to an arithmetic operator for performing an operation of the plurality of potential functions.

2. The information processing device according to claim 1,
wherein the processor is configured to determine the plurality of potential functions to be synthesized by referring to task information stored in a storage unit, the task information associating each of the plurality of tasks with a corresponding one of the plurality of potential functions.

3. The information processing device according to claim 1,
wherein, when converting the logical connector to the arithmetic operator, the processor is configured to convert a logical conjunction to an addition operator or a maximum value operator and convert a logical disjunction to a multiplication operator or a minimum value operator.

4. The information processing device according to claim 1,
- wherein the objective task is performed by a plurality of robots jointly, and
- wherein each of the plurality of tasks is to be performed by one of the plurality of robots.

5. The information processing device according to claim 1,
- wherein the processor is configured to acquire the logical expression by at least accepting an input which specifies a proposition corresponding to each of the plurality of tasks and a logical connector for the proposition.

6. The information processing device according to claim 1,
- wherein the processor is further configured to display a symbol indicative of a proposition corresponding to each of the plurality of tasks and explanation of the each of the plurality of tasks indicated by the symbol,
- wherein the processor is configured to acquire the logical expression by at least accepting an input which specifies the symbol indicative of the proposition corresponding to each of the plurality of tasks and a logical connector for the proposition.

7. The information processing device according to claim 1,
- wherein the processor is configured to further acquire a priority of each of the plurality of tasks, and
- wherein the processor is configured to synthesize the plurality of potential functions based on the logical expression and the priority.

8. The information processing device according to claim 7,
- wherein, when converting a logical conjunction between the first task and a second task included in the plurality of tasks to an addition operator, the processor is configured to multiply the first potential function corresponding to the first task by the priority of the first task and multiply a second potential function, among the plurality of functions, corresponding to the second task by the priority of the second task.

9. The information processing device according to claim 7,
- wherein, when converting a logical disjunction between the first task and a second task included in the plurality of tasks to a multiplication operator, the processor is configured to set the priority of the first task as an exponent of the first potential function corresponding to the first task and set the priority of the second task as an exponent of a second potential function, among the plurality of functions, corresponding to the second task.

10. The information processing device according to claim 1,
- wherein, provided that potential functions corresponding to any two of the plurality of tasks are denoted by "$P_A(x)$" and "$P_B(x)$", respectively, the processor is configured to convert, by use of a parameter "p", a logical conjunction between the two of the plurality of tasks and a logical disjunction between the two of the plurality of tasks to $$\begin{matrix} 0 & (p < 0 \wedge (P_A(x) = 0 \vee P_B(x) = 0)) \\ (P_A^p(x) + P_B^p(x))^{\frac{1}{p}} & \text{OTHER} \end{matrix},$$

- wherein the parameter is set to "p>0" in case of conversion of the logical conjunction and the parameter is set to "p<0" in case of conversion of the logical disjunction.

11. A control method executed by an information processing device, the control method comprising:
- acquiring a logical expression in which an objective task to be performed by a robot is expressed by a combination of a plurality of tasks;
- synthesizing a plurality of potential functions corresponding to the plurality of tasks, based on the logical expression;
- outputting a first potential function synthesized based on the logical expression as an objective function for controlling the robot; and
- causing the robot to perform a first task associated with the first potential function,
- wherein the synthesizing the plurality of potential functions based on the logical expression comprises converting a logical connector included in the logical expression to an arithmetic operator for performing an operation of the plurality of potential functions.

12. A non-transitory computer readable storage medium storing a program executed by a computer, the program causing the computer to:
- acquire a logical expression in which an objective task to be performed by a robot is expressed by a combination of a plurality of tasks;
- synthesize a plurality of potential functions corresponding to the plurality of tasks, based on the logical expression;
- output a first potential function synthesized based on the logical expression as an objective function for controlling the robot; and
- causing the robot to perform a first task associated with the first potential function,
- wherein the synthesizing the plurality of potential functions based on the logical expression comprises converting a logical connector included in the logical expression to an arithmetic operator for performing an operation of the plurality of potential functions.

\* \* \* \* \*